US011997954B2

(12) United States Patent
Monbaliu et al.

(10) Patent No.: US 11,997,954 B2
(45) Date of Patent: Jun. 4, 2024

(54) AGRICULTURAL BALER WITH DENSITY DOORS MOVED BY DUAL ACTING FLUID CYLINDERS

(71) Applicant: CNH Industrial America LLC, New Holland, PA (US)

(72) Inventors: Sven Monbaliu, Zuienkerke (BE); Karel Naeyaert, Loppem (BE); Wim Syryn, Klerken (BE); Glennys Verfaillie, Jabbeke (BE)

(73) Assignee: CNH Industrial America LLC, New Holland, PA (US)

( * ) Notice: Subject to any disclaimer, the term of this patent is extended or adjusted under 35 U.S.C. 154(b) by 613 days.

(21) Appl. No.: 17/246,036

(22) Filed: Apr. 30, 2021

(65) Prior Publication Data
US 2021/0243956 A1 Aug. 12, 2021

Related U.S. Application Data

(63) Continuation of application No. PCT/EP2019/079661, filed on Oct. 30, 2019.

(30) Foreign Application Priority Data

Nov. 2, 2018 (EP) ..................................... 18204205

(51) Int. Cl.
*A01F 15/08* (2006.01)
*A01F 15/04* (2006.01)
(Continued)

(52) U.S. Cl.
CPC ........ *A01F 15/0825* (2013.01); *A01F 15/046* (2013.01); *B30B 9/3025* (2013.01);
(Continued)

(58) Field of Classification Search
CPC .. A01F 15/042; A01F 15/046; A01F 15/0825; A01F 15/0841; A01F 15/0715;
(Continued)

(56) References Cited

U.S. PATENT DOCUMENTS 5,819,643 A 10/1998 McIlwain et al.
6,257,131 B1 * 7/2001 Wilkens .............. A01F 15/0825
100/50

(Continued)

FOREIGN PATENT DOCUMENTS

DE 197 48 748 A1 5/1999

OTHER PUBLICATIONS

Notification of Transmittal of the International Search Report and the Written Opinion of the International Searching Authority, or the Declaration dated Jan. 22, 2020 for International Patent Application No. PCT/EP2019/079661 (12 pages).

(Continued)

*Primary Examiner* — Jimmy T Nguyen
(74) *Attorney, Agent, or Firm* — Peter K. Zacharias; Rebecca L. Henkel; Rickard K. DeMille

(57) ABSTRACT

A bale chamber includes: movable density doors; at least one fluid cylinder including a fluid chamber, a piston separating the fluid chamber into a piston side and a rod side, a cylinder rod coupled to the piston on the rod side and configured to move at least one of the density doors, a piston fluid port, and a rod fluid port; and a fluid supply circuit fluidly coupled to the fluid chamber and configured to supply working fluid to the fluid chamber, the fluid supply circuit including a fluid supply controller that is selectively switchable to a first fluid supply mode and a second fluid supply mode, the fluid supply circuit being configured to supply working fluid to only the piston side when in the first fluid supply mode and to supply working fluid to both the (Continued)

piston side and the rod side when in the second fluid supply mode.

20 Claims, 5 Drawing Sheets

(51) Int. Cl.
    *A01F 15/14*     (2006.01)
    *B30B 9/30*     (2006.01)
    *F15B 15/14*     (2006.01)

(52) U.S. Cl.
    CPC ........ *F15B 15/1423* (2013.01); *A01F 15/042* (2013.01); *F15B 2215/30* (2013.01)

(58) Field of Classification Search
    CPC .......... A01F 2015/0891; F15B 15/1423; F15B 2215/30; B30B 9/3025
    USPC ........................................................ 100/179
    See application file for complete search history.

(56) References Cited

U.S. PATENT DOCUMENTS

| | | | |
|---|---|---|---|
| 8,539,878 B2 * | 9/2013 | Verhaeghe | .......... A01F 15/0875 100/48 |
| 2015/0135676 A1 | 5/2015 | Heyns | |
| 2017/0367267 A1 | 12/2017 | Schrag et al. | |
| 2018/0192591 A1 | 7/2018 | Monbaliu | |

OTHER PUBLICATIONS

Extended European Search Report dated May 14, 2019 for European Patent Application No. 18204205.1 (6 pages).

* cited by examiner

AGRICULTURAL BALER WITH DENSITY DOORS MOVED BY DUAL ACTING FLUID CYLINDERS

CROSS REFERENCE TO RELATED APPLICATION

This application is a continuation of International Application No. PCT/EP2019/079661 filed Oct. 30, 2019, which claims priority to European Patent Application No. EP 18204205.1 filed Nov. 2, 2018, the contents of which are incorporated herein by reference.

BACKGROUND OF THE INVENTION

The present invention relates to agricultural balers, and, more particularly, to density doors of agricultural balers.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers, which extend laterally outward from the sides of the plunger. The rollers on each side of the plunger are received within a respective plunger slot formed in the sidewalls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

Typically the bale chamber includes a stationary ceiling, floor and a pair of side walls at the upstream end of the bale chamber. The ceiling and side walls terminate adjacent to a number of so-called "density doors", including a top door and two side doors. The density doors may be pivoted about a pivot axis at the upstream end and clamp against the formed bale to hold the bale and provide resistance as a next bale is formed in the bale chamber. The pressure exerted by the density doors on the bale controls the density of the subsequently formed bales.

DE 197 48 748 discloses such an agricultural baler having a baling chamber of which at least a portion of one of its sides is formed by a pivotal bale chamber door. A hydraulic device is able to apply pressure to the pivotal bale chamber door, while a plunger is displaceable in the baling chamber for compressing the harvested crop therein. Further, a control device for controlling operating of the baler is foreseen and includes a load sensor for sensing the load on the plunger in which the load represents a first controlled variable, and a pressure sensor for sensing pressure in the hydraulic device in which the pressure represents a second controlled variable. An operator unit is foreseen for changing the pressure applied to the bale chamber door upon deviation of at least one of the controlled variables from a predetermined set value.

However, the required pressure that the density doors must exert on the bale to form bales with the desired density varies widely, depending on the crop material that is being baled and the desired density.

What is needed in the art is an agricultural baler that can form bales with a variety of densities.

SUMMARY OF THE INVENTION

The present invention provides an agricultural baler with at least one density door that is moved by a dual acting fluid cylinder supplied with fluid by a fluid supply circuit that is controlled by a fluid supply controller with two or more fluid supply modes.

The invention in one form is directed to a bale chamber for an agricultural vehicle including: a plurality of movable density doors; at least one fluid cylinder including a fluid chamber, a piston disposed in the fluid chamber to separate the fluid chamber into a piston side and a rod side, a cylinder rod coupled to the piston on the rod side and configured to move at least one of the density doors, a piston fluid port, and a rod fluid port; and a fluid supply circuit fluidly coupled to the fluid chamber and configured to supply working fluid to the fluid chamber, the piston fluid port fluidly coupling the piston side of the fluid chamber to the fluid supply circuit and the rod fluid port fluidly coupling the rod side of the fluid chamber to the fluid supply circuit. The fluid supply circuit includes a fluid supply controller that is selectively switchable to a first fluid supply mode and a second fluid supply mode. The fluid supply circuit is configured to supply working fluid to only the piston side of the fluid chamber when the fluid supply controller is in the first fluid supply mode and to supply working fluid to both the piston side and the rod side of the fluid chamber when the fluid supply controller is in the second fluid supply mode.

In some forms of the invention, the fluid supply circuit is configured to supply working fluid to both the piston side and the rod side of the fluid chamber at a same fluid pressure when the fluid supply controller is in the second fluid supply mode.

In some forms of the invention, the cylinder rod is configured to extend and move the at least one density door when the fluid supply controller is in the first fluid supply mode and the second fluid supply mode.

In some forms of the invention, the fluid supply controller is selectively switchable to a third fluid supply mode, the fluid supply circuit being configured to supply working fluid to only the rod side of the fluid chamber when the fluid supply controller is in the third fluid supply mode.

In some forms of the invention, the at least one fluid cylinder comprises a plurality of fluid cylinders fluidly coupled to the fluid supply circuit in parallel.

In some forms of the invention, the cylinder rod of each of the fluid cylinders is configured to move a respective one of the density doors.

In some forms of the invention, the plurality of density doors comprises a top density door and a pair of side density doors.

In some forms of the invention, the bale chamber further includes a U-shaped channel coupled to the top density door and at least one fastener coupling the cylinder rod of at least one of the fluid cylinders to the U-shaped channel.

In some forms of the invention, at least one of the side density doors comprises a bearing plate, the cylinder rod of at least one fluid cylinder bearing on the bearing plate to move the side density door when the cylinder rod extends.

In some forms of the invention, the bale chamber further includes a tension spring coupled to the bearing plate and configured to move the side density door when the fluid supply controller is in the third fluid supply mode.

In some forms of the invention, the fluid supply controller includes a proportional relief valve.

In some forms of the invention, the proportional relief valve defines a working range that includes a minimum working fluid pressure and a maximum working fluid pressure.

In yet another form of the invention, an agricultural vehicle includes a chassis and a bale chamber carried by the chassis. The bale chamber includes: a plurality of movable density doors; at least one fluid cylinder including a fluid chamber, a piston disposed in the fluid chamber to separate the fluid chamber into a piston side and a rod side, a cylinder rod coupled to the piston on the rod side and configured to move at least one of the density doors, a piston fluid port, and a rod fluid port; and a fluid supply circuit fluidly coupled to the fluid chamber and configured to supply working fluid to the fluid chamber, the piston fluid port fluidly coupling the piston side of the fluid chamber to the fluid supply circuit and the rod fluid port fluidly coupling the rod side of the fluid chamber to the fluid supply circuit. The fluid supply circuit includes a fluid supply controller that is selectively switchable to a first fluid supply mode and a second fluid supply mode. The fluid supply circuit is configured to supply working fluid to only the piston side of the fluid chamber when the fluid supply controller is in the first fluid supply mode and to supply working fluid to both the piston side and the rod side of the fluid chamber when the fluid supply controller is in the second fluid supply mode.

In yet another form of the invention, a method of controlling at least one movable density door of a bale chamber of an agricultural vehicle is provided. The bale chamber includes a plurality of movable density doors, at least one fluid cylinder including a fluid chamber, a piston disposed in the fluid chamber to separate the fluid chamber into a piston side and a rod side, a cylinder rod coupled to the piston on the rod side and configured to move at least one of the density doors, a piston fluid port, and a rod fluid port, and a fluid supply circuit fluidly coupled to the fluid chamber and configured to supply working fluid to the fluid chamber, the piston fluid port fluidly coupling the piston side of the fluid chamber to the fluid supply circuit and the rod fluid port fluidly coupling the rod side of the fluid chamber to the fluid supply circuit. The method includes: supplying working fluid to only the piston side of the fluid chamber so the at least one density door exerts a first pressure on crop material in the bale chamber; and supplying working fluid to both the piston side and the rod side of the fluid chamber so the at least one density door exerts a second pressure on crop material in the bale chamber, the second pressure being less than the first pressure.

An advantage of the present invention is that the fluid supply controller can allow the density doors to exert both relatively high and low amounts of pressure on crop material in the bale chamber.

Another advantage is that the fluid supply controller can be a mechanical controller, such as a proportional relief valve, that does not require sophisticated electronics to control.

Yet another advantage is that the density doors can be opened and closed relatively quickly.

Yet another advantage is that a top density door can be closed without needing to use a spring.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
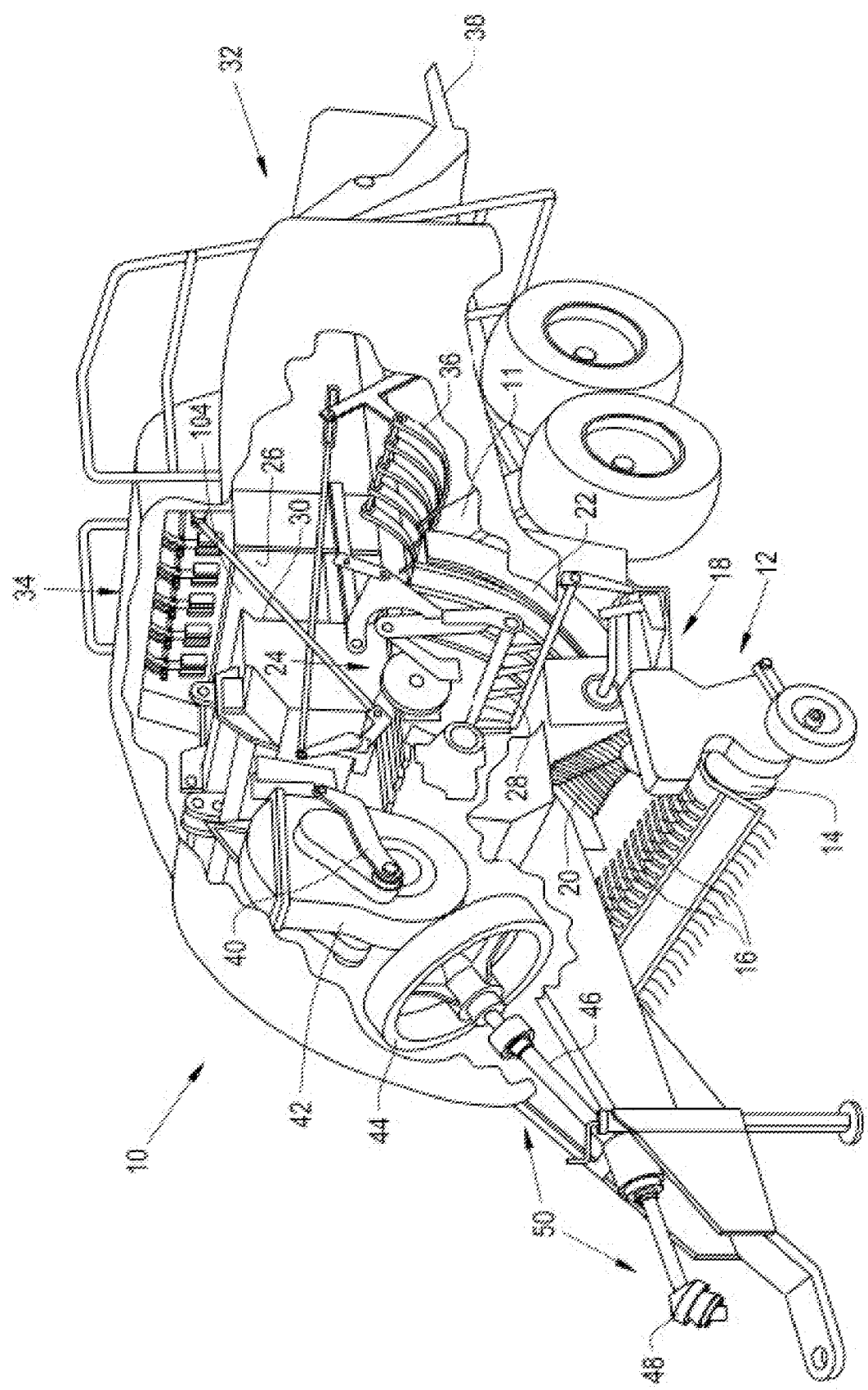
FIG. 1 is a perspective cutaway view showing the internal workings of a large square baler, which includes a bale chamber formed according to the present invention.

Referring now to the drawings, and more particularly to FIG. 1, there is shown a perspective cutaway view showing the internal workings of a large square baler 10 including a chassis 11. The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a bale chamber 26, which is carried by the chassis 11 and may also be referred to as a "main bale chamber." The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale from an inlet end 104 of the main bale chamber 26 toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

The plunger 30 is connected via a crank arm 40 with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown).

Figure 2:
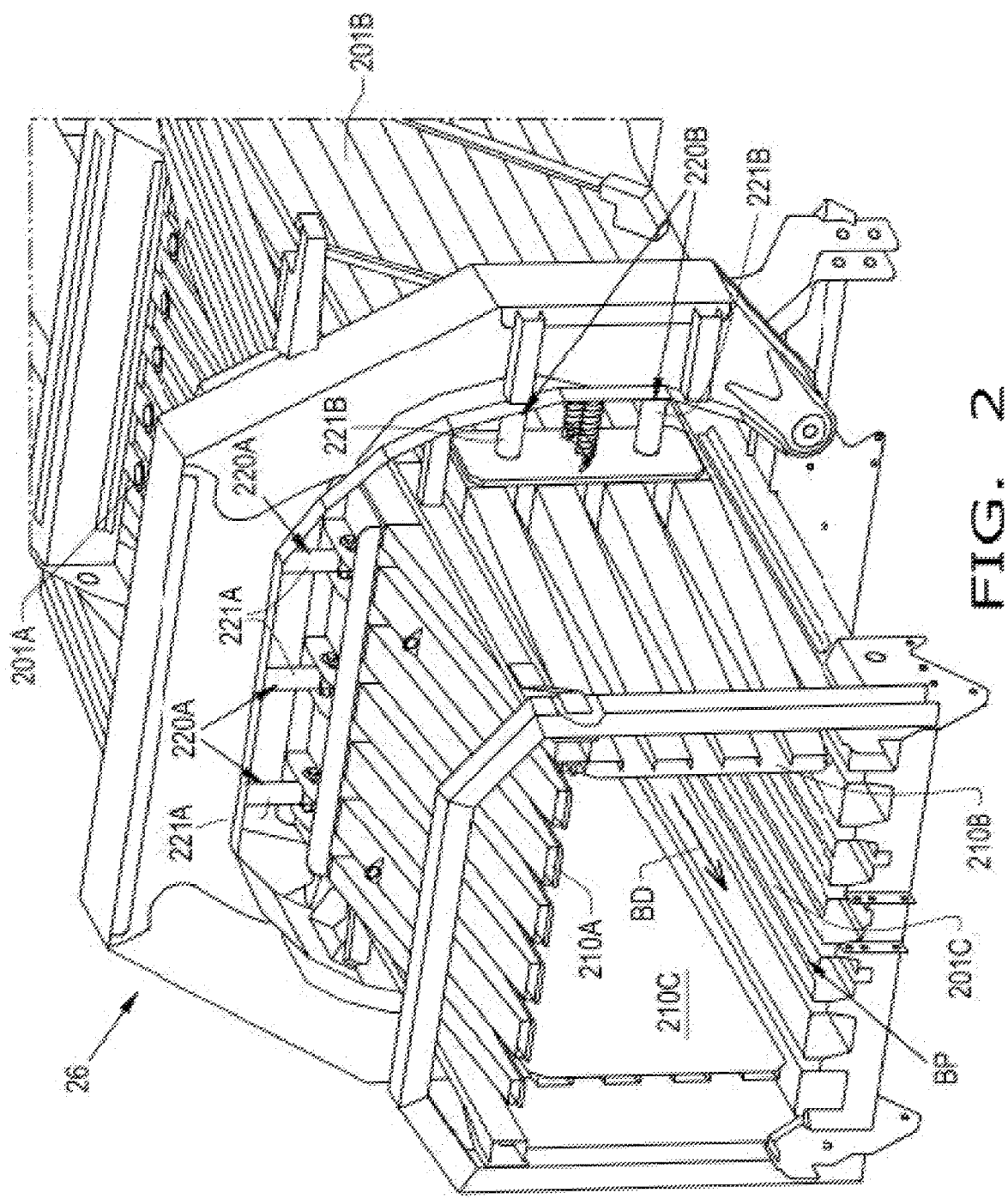
FIG. 2 is a perspective view of the bale chamber formed according to the present invention.

Referring now to FIG. 2, a perspective view of the bale chamber 26 is illustrated. The bale chamber 26 generally includes a plurality of stationary walls, which may include a top wall 201A, a pair of opposed side walls 201B, and a stationary bottom wall 201C opposite the top wall 201A. As the bale flows through the bale chamber 26 in a bale forming direction, which is designated by arrow BD, the bale encounters movable density doors 210A, 210B, 210C. In some embodiments, the movable density door 210A is a top density door that is pivotably coupled to a stationary part of the baling chamber 26 so as to form the top wall 201A and the movable density doors 210B and 210C are a pair of side density doors that are each pivotably coupled to a stationary part of the baling chamber 26 so as to form respective side walls 201B. A bale pressing area BP is defined between the density doors 210A, 210B, 210C and the stationary bottom wall 201C where the density doors 210A, 210B, 210C exert a pressure on a bale. The pressure exerted on the bale by the density doors 210A, 210B, 210C holds the bale in place as the plunger 30 compresses the wads of crop into flakes. A greater pressure exerted on the bale by the density doors 210A, 210B, 210C, therefore, results in a more densely packed bale that exits the bale chamber 26.

To adjust the size of the bale pressing area BP, and thus the pressure exerted on the bale by the density doors 210A, 210B, 210C, at least one fluid cylinder 220A, 220B is provided to move the density doors 210A, 210B, 210C. In the illustrated embodiment, the top density door 210A is moved by three fluid cylinders 220A and each of the side density doors 210B, 210C is moved by two fluid cylinders 220B. Each of the fluid cylinders 220A, 220B includes a cylinder rod 221A, 221B that is configured to move one of the density doors 210A, 210B, 210C, as will be described further herein. In some embodiments, the fluid cylinders 220A, 220B are hydraulically powered cylinders supplied with, for example, pressurized oil to extend and retract the cylinder rods 221A, 221B. It should be appreciated that the fluid cylinders 220A, 220B may be powered by fluids other than oil, such as other incompressible fluids, in accordance with the present invention.

Figure 3:
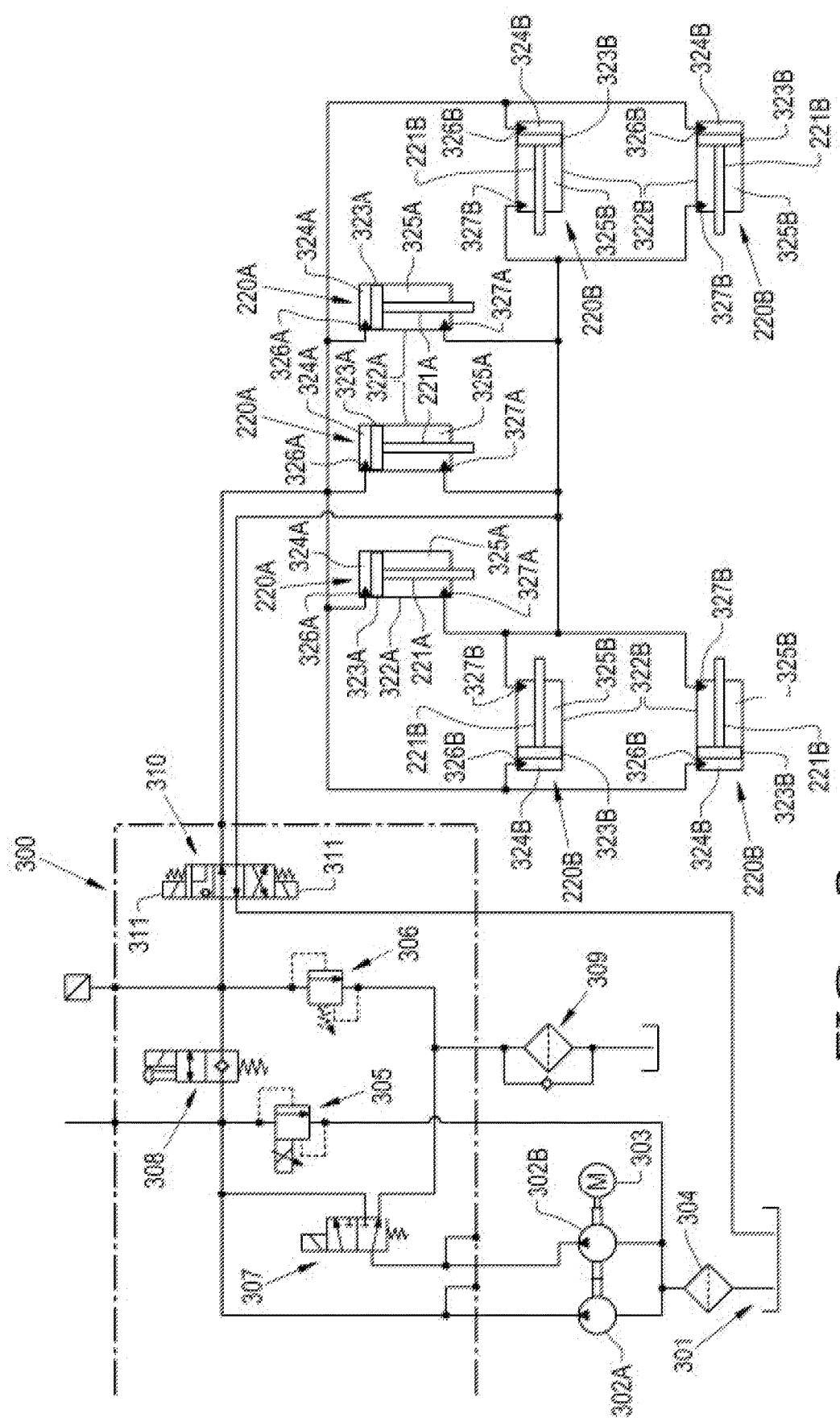
FIG. 3 is a schematic view of a fluid supply circuit that is fluidly coupled to fluid cylinders coupled to density doors of the bale chamber illustrated in FIGS. 1-2.

Referring now to FIG. 3, a schematic view is provided that illustrates a fluid supply circuit 300 fluidly coupled to the fluid cylinders 220A, 220B to supply working fluid to the fluid cylinders 220A, 220B. Each of the fluid cylinders 220A, 220B includes a respective fluid chamber 322A, 322B and a piston 323A, 323B disposed in the fluid chamber 322A, 322B. The pistons 323A, 323B separate the fluid chambers 322A, 322B into respective piston sides 324A, 324B and rod sides 325A, 325B, with the cylinder rods 221A, 221B each coupling to a respective piston 323A, 323B on the rod side 325A, 325B of the fluid chamber 322A, 322B. Each of the fluid cylinders 220A, 220B includes a piston fluid port 326A, 326B that fluidly couples the piston side 324A, 324B of the fluid chamber 322A, 322B with the fluid supply circuit 300. Each of the fluid cylinders 220A, 220B also includes a rod fluid port 327A, 327B that fluidly couples the rod side 325A, 325B of the fluid chamber 322A, 322B with the fluid supply circuit 300.

The fluid supply circuit 300, which may be part of or connected to a main fluid circuit of the baler 10, is configured to supply working fluid to the fluid chambers 322A, 322B of the fluid cylinders 220A, 220B to extend or retract the cylinder rods 221A, 221B and move the density doors 210A, 210B, 210C. The fluid supply circuit 300 may include a fluid reservoir 301, which may be filled with a working fluid such as water or oil. One or more pumps 302A, 302B may be fluidly coupled to the fluid reservoir 301 and driven by a motor 303 to pressurize and drive fluid through the fluid supply circuit 300. In some embodiments, a suction screen 304 is disposed between the fluid reservoir 301 and the pumps 302A, 302B. In some embodiments, the fluid supply circuit 300 includes a manual pressure relief valve 305 to lessen the risk of excessive pressure developing in the fluid supply circuit 300, a pressure control module 306, and spool valves 307, 308 to direct the flow of fluid in the fluid supply circuit 300. The fluid supply circuit 300 may also include one or more filter 309 to capture contaminants that are entrained in the fluid flow. It should be appreciated that the fluid supply circuit 300 may incorporate additional and/or different elements than those previously described, depending on the operating requirements.

The fluid supply circuit 300 also includes a fluid supply controller 310 that is configured to control the supply of fluid from the fluid supply circuit 300 to the fluid cylinders 220A, 220B. The fluid supply controller 310, which may be a mechanical or electrical controller, is selectively switchable to a first fluid supply mode, which is illustrated in FIG. 3, and a second fluid supply mode. The fluid supply controller 310 may be switched between fluid supply modes by, for example, one or more solenoid 311 of the fluid supply controller 310. When the fluid supply controller 310 is in the first fluid supply mode, the fluid supply circuit 300 supplies working fluid to only the piston sides 324A, 324B of the fluid chambers 322A, 322B of the fluid cylinders 220A, 220B through the piston fluid ports 326A, 326B. In some embodiments, the fluid cylinders 220A, 220B are all fluidly coupled to the fluid supply circuit 300 in parallel, so a fluid pressure of working fluid supplied to the fluid chambers 322A, 322B from the fluid supply circuit 300 is generally the same for all of the fluid cylinders 220A, 220B.

Supplying the working fluid only to the piston sides 324A, 324B of the fluid chambers 322A, 322B urges the pistons 323A, 323B toward the respective density doors 210A, 210B, 210C to extend the cylinder rods 221A, 221B and move the density doors 210A, 210B, 210C together, i.e., close the density doors 210A, 210B, 210C. Fluid on the rod sides 325A, 325B of the fluid chambers 322A, 322B, on the other hand, is urged out of the fluid chambers 322A, 322B to, for example, the fluid reservoir 301. As the density doors 210A, 210B, 210C move together, the bale pressing area BP decreases in size, causing the density doors 210A, 210B, 210C to exert a greater pressure on bales in the bale pressing area BP. Simultaneously, the exit space for the bale to move through decreases, which makes it harder for the bale to slide through to the back 32 of the baler. So, by applying more pressure on the sides of the formed bale, and simultaneously decreasing the exit space for the bale, will increase the density of the formed bales. In this respect, the first fluid supply mode may be referred to as a "high pressure" mode due to the relatively high pressure that the density doors 210A, 210B, 210C exert on the bales when the fluid supply controller 310 is in the first fluid supply mode. It should be appreciated that the pressure exerted on the bales in the bale pressing area BP by the density doors 210A, 210B, 210C correlates with the pressure of the working fluid that is supplied to only the piston sides 324A, 324B of the fluid chambers 322A, 322B, i.e., a greater working fluid pressure supplied to only the piston sides 324A, 324B corresponds to a greater pressure exerted on the bales by the density doors 210A, 210B, 210C.

In some embodiments, the fluid supply controller 310 is a proportional relief valve defining a working range of fluid pressures that are supplied to the fluid cylinders 220A, 220B. The working range includes a minimum working fluid pressure, which is the minimum fluid pressure value that the fluid supply circuit 300 is configured to supply to the fluid cylinders 220A, 220B, and a maximum working fluid pressure, which is the maximum fluid pressure value that the fluid supply circuit 300 is configured to supply to the fluid cylinders 220A, 220B.

When the fluid supply controller 310 switches to the second fluid supply mode, the fluid supply circuit 300 supplies working fluid to both the piston sides 324A, 324B and the rod sides 325A, 325B of the fluid chambers 322A, 322B. The fluid pressure on the piston sides 324A, 324B of the fluid chambers 322A, 322B produces extension forces on the pistons 323A, 323B that urge the coupled cylinder rods 221A, 221B to extend, i.e., close the density doors 210A, 210B, 210C. The fluid pressure on the rod sides 325, 325B of the fluid chambers 322A, 322B, on the other hand, produces retraction forces on the pistons 323A, 323B that urge the coupled cylinder rods 221A, 221B to retract, i.e., open the density doors 210A, 210B, 210C. If the produced extension forces are greater than the retraction forces when the fluid supply controller 310 is in the second fluid supply state, the cylinder rods 221A, 221B will still extend to close the density doors 210A, 210B, 210C, but the net force extending the cylinder rods 221A, 221B will be equal to the extension forces minus the retraction forces. If, however, the produced retraction forces are greater than the extension forces, the cylinder rods 221A, 221B will retract to open the density doors 210A, 210B, 210C. In this sense, the fluid cylinders 220A, 220B are dual acting fluid cylinders that can be supplied with working fluid pressure on either side 324A, 324B, 325A, 325B of the pistons 323A, 323B to control extension and retraction of the cylinder rods 221A, 221B.

In some embodiments, such as the illustrated embodiment, the fluid supply circuit 300 is configured to supply working fluid to both the piston sides 324A, 324B and the rod sides 325A, 325B of the fluid chambers 322A, 322B at a same fluid pressure when the fluid supply controller 310 is in the second fluid supply mode, i.e., the fluid pressure on the piston side 324A, 324B is the same as the fluid pressure on the rod side 325A, 325B of the fluid chambers 322A, 322B. Even though the fluid pressures on the sides 324A, 324B, 325A, 325B may be equal, the cylinder rods 221A, 221B will still be urged to extend when the fluid supply controller 310 is in the second fluid supply mode. This is due to the cylinder rods 221A, 221B, which are on the rod sides 325A, 325B of the fluid chambers 322A, 322B, being coupled to the pistons 323A, 323B. The cylinder rods 221A, 221B cover surface area of the pistons 323A, 323B on the rod sides 325A, 325B so the retraction forces exerted on the pistons 323A, 323B by the working fluid supplied to the rod sides 325A, 325B are still less than the extension forces exerted on the pistons 323A, 323B by the working fluid supplied to the piston sides 324A, 324B. However, the net extension forces that urge the cylinder rods 221A, 221B to extend and close the density doors 210A, 210B, 210C will be relatively small compared to the extension force produced when the fluid supply controller 310 is in the first fluid supply mode. The net extension forces on the pistons 323A, 323B when the fluid supply controller 310 is in the second fluid supply mode may be, for example, equal to the product of the working fluid pressure supplied to the fluid cylinders 220A, 220B and a surface area of the pistons 323A, 323B covered by the cylinder rods 221A, 221B. Thus, while the cylinder rods 221A, 221B will be urged to extend when the fluid supply controller 310 is in the first fluid supply mode and the second fluid supply mode, the net extension force will be less when the fluid supply controller 310 is in the second fluid supply mode so the density doors 210A, 210B, 210C will exert a second, lower pressure on bales in the bale pressing area BP. In this respect, the second fluid supply mode may be referred to as a "low pressure" mode due to the relatively low pressure exerted on the bale by the density doors 210A, 210B, 210C in the bale pressing area BP despite the supplied fluid pressure from the fluid supply circuit 300 being the same as when the fluid supply controller 310 is in the first fluid supply mode ("high pressure" mode).

From the foregoing, it should be appreciated that configuring the fluid cylinders 220A, 220B as dual acting fluid cylinders that are coupled to a fluid supply controller 310 with different fluid supply modes allows the density doors 210A, 210B, 210C to exert a wide range of exerted pressures on bales in the bale pressing area BP. For example, when the fluid supply controller 310 is in the first fluid supply mode, a first pressure exerted by the density doors 210A, 210B, 210C on the bale can be in the working range of the fluid supply controller 310, such as between 4 MPa and 21 MPa. When the fluid supply controller 310 switches to the second fluid supply mode, a second pressure exerted by the density doors 210A, 210B, 210C on the bale can be less than the minimum working fluid pressure value of the fluid supply controller 310, i.e., lower than the first pressure, due to counteracting forces produced in the fluid chambers 322A, 322B. The second pressure exerted by the density doors 210A, 210B, 210C on the bale may be, for example, 2 MPa, which is equal to 20 bar. The density doors 210A, 210B, 210C exerting a pressure below the minimum working fluid pressure value of the fluid supply controller 310 may be desirable when, for example, the baled crop material is wet crop silage or other crop material that does not require, or is harmed by, high baling density.

In some embodiments, the fluid supply controller 310 is switchable to a third fluid supply mode. The fluid supply circuit 300 is configured to supply working fluid to only the rod sides 325A, 325B of the fluid chambers 322A, 322B when the fluid supply controller 310 is in the third fluid supply mode. Thus, the cylinder rods 221A, 221B are urged to retract, without a significant counteracting extension force, when the fluid supply controller 310 is in the third fluid supply mode to fully open the density doors 210A, 210B, 210C and create a maximum size of the bale pressing area BP. It should be appreciated that while the fluid supply controller 310 is described as having a "first" fluid supply mode, a "second" fluid supply mode, and a "third" fluid supply mode, the "first," "second," and "third" designations do not refer to a specific sequence of the supply modes. In other words, the fluid supply controller 310 may be switched from the first fluid supply mode to the third fluid supply mode, and vice versa, without first being switched to the second fluid supply mode in accordance with the present invention.

Figure 4:
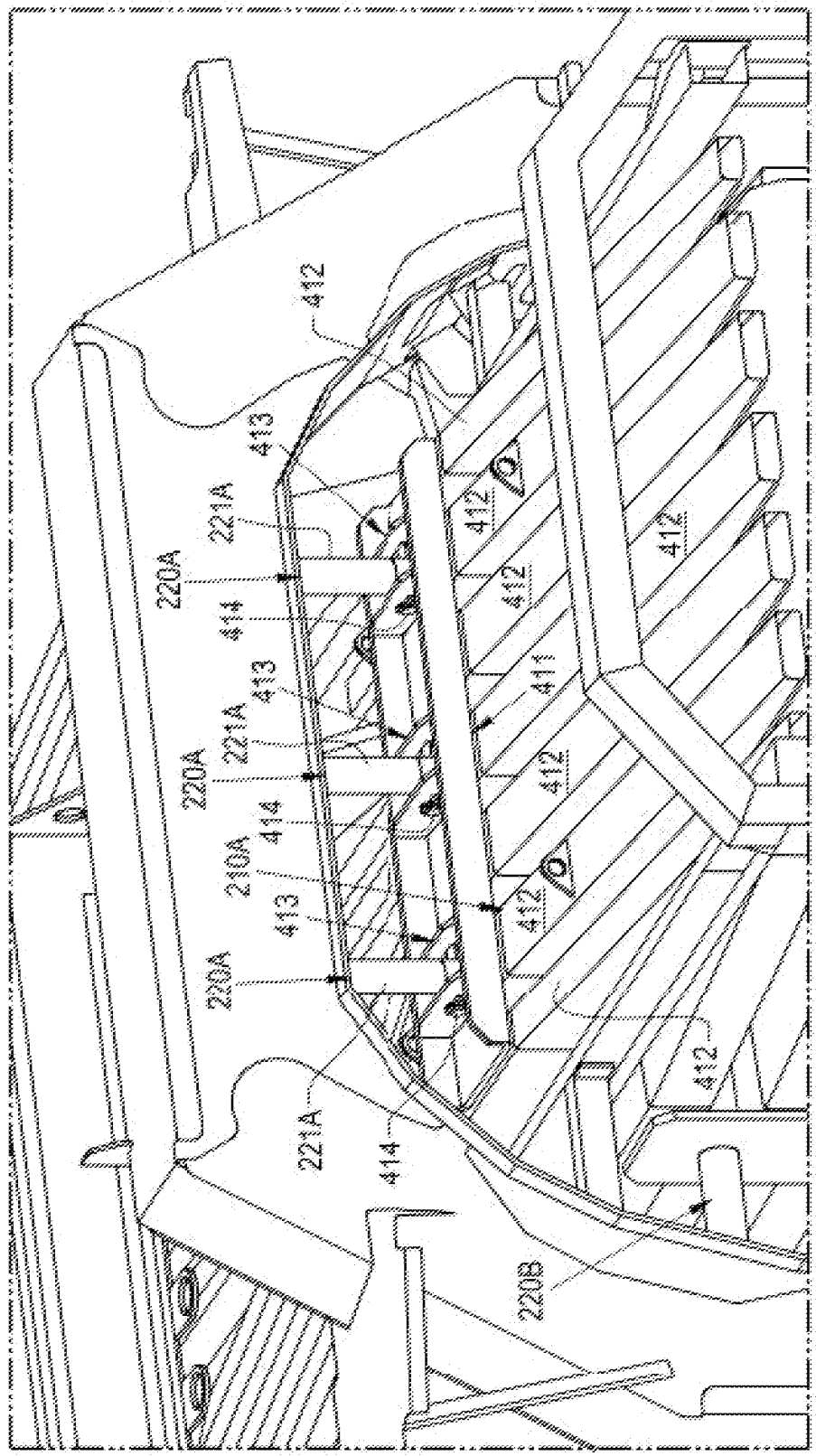
FIG. 4 is a top perspective view of a top density door of the bale chamber illustrated in FIGS. 1-2.

Referring now to FIG. 4, it is illustrated how the fluid cylinders 220A move the top density door 210A. As can be seen, the top density door 210A may include a U-shaped channel 411 that is connected to girders 412 of the top density door 210A. The cylinder rods 221A of the fluid cylinders 220A may each be coupled to a fastening region 413 of the U-shaped channel 411 by fasteners such as, for example, bolts 414. By coupling the cylinder rods 221A of the fluid cylinders 220A to the U-shaped channel 411 via the bolts 414, extension and retraction of the cylinder rods 221A can move the top density door 210A to adjust the size of the bale pressing area BP.

Figure 5:
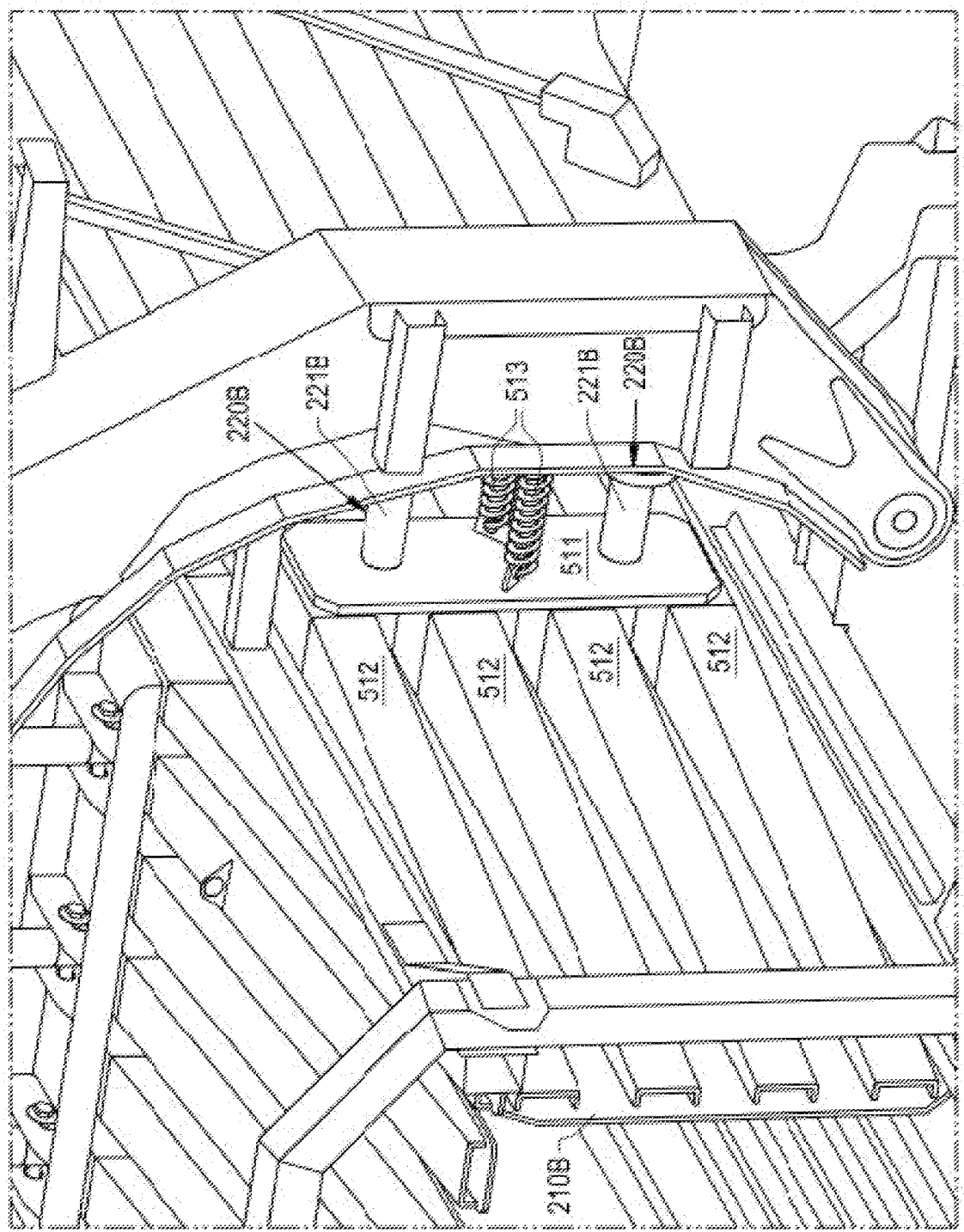
FIG. 5 is a side perspective view of a side density door of the bale chamber illustrated in FIGS. 1-2.

Referring now to FIG. 5, it is illustrated how the fluid cylinders 220B move one of the side density doors, such as the side density door 210B. In the illustrated embodiment, a clearance between the side density door 210B and surrounding elements is not great enough to allow attachment of a U-shaped channel for connecting the fluid cylinders 220B to the side density door 210B by a fastener. Instead, the side density door 210B includes a bearing plate 511, which may be attached to girders 512 of the side density door 210B. The cylinder rods 221B of the fluid cylinders 220B bear on the bearing plate 511 so extension of the cylinder rods 221B moves the side density door 210B toward the other side density door 210C to decrease the bale pressing area BP. However, the cylinder rods 221B of the fluid cylinders 220B are not fastened to the bearing plate 511, so retraction of the cylinder rods 221B does not tend to retract the side density door 210B. In order to retract the side density door 210B to open the side density door 210B, one or more spring 513, illustrated as a pair of tension springs, is coupled to the side density door 210B, such as to the bearing plate 511. When the cylinder rods 221B are urged to extend, such as when the fluid supply controller 310 is in the first fluid supply mode or the second fluid supply mode, the cylinder rods 221B overcome retraction forces of the tension springs 513 to extend and push on the bearing plate 511 to move the side density door 210B. When the cylinder rods 221B are urged to retract, such as when the fluid supply controller 310 is in the third fluid supply mode, the cylinder rods 221B retract. The retracted cylinder rods 221B no longer overcome the retraction forces of the tension springs 513 acting on the side density door 210B, allowing the tension springs 513 to move and open the side density door 210B. Thus, the cylinder rods 221B can close the side density door 210B while the tension springs 513 can open the side density door 210B, allowing both closing and opening movements of the side density door 210B in an area with little clearance between elements. It should be appreciated that while the manner of moving side density door 210B by fluid cylinders 220B and tension springs 513 is illustrated in FIG. 5, the other side density door 210C may be moved by fluid cylinders 220B and tension springs 513 in a similar manner.

A similar system as used to move the top density door 210A can be used to move the side density doors 210B and 210C. Likewise, a similar system as used to move the side doors 210B and 210C can also be used to move the top density door 210A.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A bale chamber for an agricultural vehicle, the bale chamber comprising:
    a plurality of movable density doors;
    at least one fluid cylinder comprising a fluid chamber, a piston disposed in the fluid chamber to separate the fluid chamber into a piston side and a rod side, a cylinder rod coupled to the piston on the rod side and configured to move at least one of the density doors, a piston fluid port, and a rod fluid port; and
    a fluid supply circuit fluidly coupled to the fluid chamber and configured to supply working fluid to the fluid chamber, the piston fluid port fluidly coupling the piston side of the fluid chamber to the fluid supply circuit and the rod fluid port fluidly coupling the rod side of the fluid chamber to the fluid supply circuit, the fluid supply circuit comprising a fluid supply controller that is selectively switchable to a first fluid supply mode and a second fluid supply mode, the fluid supply circuit being configured to supply working fluid to only the piston side of the fluid chamber when the fluid supply controller is in the first fluid supply mode and to supply working fluid to both the piston side and the rod side of the fluid chamber when the fluid supply controller is in the second fluid supply mode.

2. The bale chamber of claim 1, wherein the fluid supply circuit is configured to supply working fluid to both the piston side and the rod side of the fluid chamber at a same fluid pressure when the fluid supply controller is in the second fluid supply mode.

3. The bale chamber of claim 2, wherein the cylinder rod is configured to extend and move the at least one density door when the fluid supply controller is in the first fluid supply mode and the second fluid supply mode.

4. The bale chamber of claim 3, wherein the fluid supply controller is selectively switchable to a third fluid supply mode, the fluid supply circuit being configured to supply working fluid to only the rod side of the fluid chamber when the fluid supply controller is in the third fluid supply mode.

5. The bale chamber of claim 1, wherein the at least one fluid cylinder comprises a plurality of fluid cylinders fluidly coupled to the fluid supply circuit in parallel.

6. The bale chamber of claim 5, wherein the cylinder rod of each of the fluid cylinders is configured to move a respective one of the density doors.

7. The bale chamber of claim 6, wherein the plurality of density doors comprises a top density door and a pair of side density doors.

8. The bale chamber of claim 7, further comprising a U-shaped channel coupled to the top density door and at least one fastener coupling the cylinder rod of at least one of the fluid cylinders to the U-shaped channel.

9. The bale chamber of claim 7, wherein at least one of the side density doors comprises a bearing plate, the cylinder rod of at least one fluid cylinder bearing on the bearing plate to move the side density door when the cylinder rod extends.

10. The bale chamber of claim 9, further comprising at least one tension spring coupled to the bearing plate, wherein the fluid supply controller is selectively switchable to a third fluid supply mode, the fluid supply circuit being configured to supply working fluid to only the rod side of the fluid chamber when the fluid supply controller is in the third fluid supply mode, the at least one tension spring being configured to move the side density door when the fluid supply controller is in the third fluid supply mode.

11. The bale chamber of claim 1, wherein the fluid supply controller comprises a proportional relief valve.

12. The bale chamber of claim 11, wherein the proportional relief valve defines a working range that comprises a minimum working fluid pressure and a maximum working fluid pressure.

13. An agricultural vehicle, comprising:
a chassis; and
a bale chamber carried by the chassis, the bale chamber comprising:
  a plurality of movable density doors;
  at least one fluid cylinder comprising a fluid chamber, a piston disposed in the fluid chamber to separate the fluid chamber into a piston side and a rod side, a cylinder rod coupled to the piston on the rod side and configured to move at least one of the density doors, a piston fluid port, and a rod fluid port; and
  a fluid supply circuit fluidly coupled to the fluid chamber and configured to supply working fluid to the fluid chamber, the piston fluid port fluidly coupling the piston side of the fluid chamber to the fluid supply circuit and the rod fluid port fluidly coupling the rod side of the fluid chamber to the fluid supply circuit, the fluid supply circuit comprising a fluid supply controller that is selectively switchable to a first fluid supply mode and a second fluid supply mode, the fluid supply circuit being configured to supply working fluid to only the piston side of the fluid chamber when the fluid supply controller is in the first fluid supply mode and to supply working fluid to both the piston side and the rod side of the fluid chamber when the fluid supply controller is in the second fluid supply mode.

14. The agricultural vehicle of claim 13, wherein the fluid supply circuit is configured to supply working fluid to both the piston side and the rod side of the fluid chamber at a same fluid pressure when the fluid supply controller is in the second fluid supply mode.

15. The agricultural vehicle of claim 14, wherein the cylinder rod is configured to extend and move the at least one density door when the fluid supply controller is in the first fluid supply mode and the second fluid supply mode.

16. The agricultural vehicle of claim 15, wherein the fluid supply controller is selectively switchable to a third fluid supply mode, the fluid supply circuit being configured to supply working fluid to only the rod side of the fluid chamber when the fluid supply controller is in the third fluid supply mode.

17. The agricultural vehicle of claim 13, wherein the at least one fluid cylinder comprises a plurality of fluid cylinders fluidly coupled to the fluid supply circuit in parallel.

18. The agricultural vehicle of claim 17, wherein the cylinder rod of each of the fluid cylinders is configured to move a respective one of the density doors.

19. The agricultural vehicle of claim 18, wherein the plurality of density doors comprises a top density door and a pair of side density doors.

20. A method of controlling at least one movable density door of a bale chamber of an agricultural vehicle, the bale chamber comprising a plurality of movable density doors, at least one fluid cylinder comprising a fluid chamber, a piston disposed in the fluid chamber to separate the fluid chamber into a piston side and a rod side, a cylinder rod coupled to the piston on the rod side and configured to move at least one of the density doors, a piston fluid port, and a rod fluid port, and a fluid supply circuit fluidly coupled to the fluid chamber and configured to supply working fluid to the fluid chamber, the piston fluid port fluidly coupling the piston side of the fluid chamber to the fluid supply circuit and the rod fluid port fluidly coupling the rod side of the fluid chamber to the fluid supply circuit, the method comprising:
supplying working fluid to only the piston side of the fluid chamber so the at least one density door exerts a first pressure on crop material in the bale chamber; and
supplying working fluid to both the piston side and the rod side of the fluid chamber so the at least one density door exerts a second pressure on crop material in the bale chamber, the second pressure being less than the first pressure.

* * * * *